United States Patent
Job et al.

(10) Patent No.: US 12,016,011 B2
(45) Date of Patent: Jun. 18, 2024

(54) HANDLING SCHEDULING REQUEST FAILURE IN A NETWORK

(71) Applicant: SAMSUNG ELECTRONICS CO., LTD., Suwon-si (KR)

(72) Inventors: Allen Job, Bangalore (IN); Akhil Shukla, Bangalore (IN); Vikash Kumar, Bangalore (IN); Animesh Kumar, Bangalore (IN); Gaurav Singh, Bangalore (IN); Palani Lakshmanan, Bangalore (IN); Dheeraj Kumar, Bangalore (IN); Satya Venkata Uma Kishore Godavarti, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 379 days.

(21) Appl. No.: 17/576,760

(22) Filed: Jan. 14, 2022

(65) Prior Publication Data
US 2022/0232586 A1    Jul. 21, 2022

(30) Foreign Application Priority Data
Jan. 15, 2021 (IN) .............................. 202141002005

(51) Int. Cl.
*H04W 72/12* (2023.01)
*H04L 1/08* (2006.01)
(Continued)

(52) U.S. Cl.
CPC .......... *H04W 72/1263* (2013.01); *H04L 1/08* (2013.01); *H04W 72/02* (2013.01); *H04W 72/21* (2023.01); *H04W 72/23* (2023.01)

(58) Field of Classification Search
CPC . H04W 76/1263; H04W 76/14; H04W 76/02; H04W 76/0413; H04W 76/23;
(Continued)

(56) References Cited

U.S. PATENT DOCUMENTS 8,625,442 B2    1/2014 Ratasuk et al.
10,027,359 B2 *  7/2018 Krishnamoorthi ..........................
H04W 28/0215
(Continued)

FOREIGN PATENT DOCUMENTS

| CN | 108347773 | 7/2018 |
|---|---|---|
| CN | 112106427 | 12/2020 |

(Continued)

OTHER PUBLICATIONS

Search Report and Written Opinion issued Apr. 20, 2022 in counterpart International Patent Application No. PCT/KR2022/000730.
(Continued)

*Primary Examiner* — Rasheed Gidado
(74) *Attorney, Agent, or Firm* — Nixon & Vanderhye, P.C.

(57) ABSTRACT

In an example embodiment, a method of reducing SR max retransmissions in a communication network is disclosed. The method includes: accessing an SR max retransmission UE pool stored in a storage of the base station, the SR max retransmission UE pool being a list of plurality of UEs which experienced SR max retransmission. The method further includes identifying at least one UE in the SR max retransmission pool that would enter an SR max retransmission state, based on a last PUSCH uplink time period and a SR max retransmission time period associated with the at least one UE. Further, the method includes allocating a dummy UL grant to the identified at least one UE.

17 Claims, 5 Drawing Sheets

(51) Int. Cl.
  *H04W 72/02* (2009.01)
  *H04W 72/04* (2023.01)
  *H04W 72/1263* (2023.01)
  *H04W 72/14* (2009.01)
  *H04W 72/21* (2023.01)
  *H04W 72/23* (2023.01)

(58) Field of Classification Search
  CPC .......... H04W 76/21; H04L 1/08; H04L 1/189; H04L 1/18; H04L 1/64; H04L 1/1893
  See application file for complete search history.

(56) References Cited

U.S. PATENT DOCUMENTS

| | | | |
|---|---|---|---|
| 10,568,128 B2* | 2/2020 | Li | H04W 72/23 |
| 2012/0190376 A1* | 7/2012 | Rosa | H04W 72/21 |
| | | | 455/450 |
| 2017/0310447 A1 | 10/2017 | Kusashima et al. | |
| 2018/0368172 A1 | 12/2018 | Li et al. | |
| 2020/0029351 A1 | 1/2020 | Xiang et al. | |
| 2020/0187234 A1 | 6/2020 | Yue et al. | |
| 2020/0196327 A1 | 6/2020 | Zhang et al. | |
| 2021/0227562 A1 | 7/2021 | Mazloum et al. | |
| 2022/0183002 A1 | 6/2022 | Yeo et al. | |

FOREIGN PATENT DOCUMENTS

| | | |
|---|---|---|
| EP | 3 639 603 | 4/2020 |
| KR | 10-2019-0125442 A | 11/2019 |
| KR | 10-2020-0112569 | 10/2020 |
| WO | 2016/060242 | 4/2016 |
| WO | 2018/231785 | 12/2018 |
| WO | 2020/184914 | 9/2020 |

OTHER PUBLICATIONS

"3GPP; TSG RAN; NR; RRC protocol specification," 3GPP TS 38.331 v16.3.1, Jan. 20, 2021, section 6.2.2, 934 pages.
Examination Report dated Sep. 13, 2022 in counterpart Indian Patent Application No. 202141002005 and English-language translation.

* cited by examiner

HANDLING SCHEDULING REQUEST FAILURE IN A NETWORK

CROSS-REFERENCE TO RELATED APPLICATION

This application is based on and claims priority under 35 U.S.C. § 119 to Indian Patent Application No. 202141002005, filed on Jan. 15, 2021, in the Indian Patent Office, the disclosure of which is incorporated by reference herein in its entirety.

BACKGROUND

Field

The disclosure relates to handling scheduling request (SR) max retransmissions failures in communication networks and, in particular, relates to reducing SR max retransmissions in communication networks.

Description of Related Art

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system may also be called a 'beyond 4G network' or a 'post LTE system'.

The 5G communication system is considered to be implemented in higher frequency (mmWave) bands, e.g., 60 GHz bands, to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Scheduling Request (SR) may be understood as a request for scheduling radio resource for uplink transmission, which is made by a user Equipment (UE), for example, a smartphone, to a base station, for example, a gNodeB (gNB).

The UE sends the SR on Physical Uplink Control Channel (PUCCH) when regular Buffer status report (BSR) is triggered, and the UE does not have radio resource(s) to transmit this BSR to the gNB. On receiving the SR, gNB will give an uplink grant to the UE.

In certain events, for example, when the SR is not received at the gNB or the grant is not decoded at the UE, for example, due to SR Decoding failure or UL grant decoding failure, or SR scheduling failure at gNB etc., the UE will attempt transmission of the SR. When the number of consecutive unsuccessful SR attempts made by the UE reaches the maximum (sr-TransMax), the UE will release its PUCCH & SRS resource and starts Random access procedure. Accordingly, the UE needs to successfully complete Random access procedure and Radio Resource Control (RRC) Reconfiguration, to resume DL/UL Data traffic.

Thus, the SR Max Retransmission situation results in significant impact to the overall system Key Performance Indicators (KPIs) especially to latency and user experience. This procedure has an overhead in terms of time, resources, signalling and processing at both the UE and the gNB.

Thus, there is a need for a solution that addresses the above deficiencies.

SUMMARY

In an example embodiment, a method of reducing scheduling request (SR) max retransmissions in a communication network is disclosed. The method includes: accessing an SR max retransmission user equipment (UE) pool stored in a storage of the base station, the SR max retransmission UE pool comprising a list of plurality of UEs which have experienced SR max retransmission; identifying at least one UE in the SR max retransmission pool that would enter an SR max retransmission state, based on a last physical uplink shared channel (PUSCH) uplink time period and a SR max retransmission time period associated with the at least one UE, wherein the last PUSCH uplink time period is a time period elapsed since last PUSCH packet from UE was received, and wherein the SR max retransmission time period is a time period after which the UE would enter the SR max retransmission state; and allocating a dummy uplink (UL) grant to identified at least one UE.

In an example embodiment, a method of reducing SR max retransmissions in a communication network is disclosed. The method includes: maintaining a scheduling request (SR) max retransmission user equipment (UE) pool at the base station, wherein the SR max retransmission UE pool comprises a list of plurality of UEs, which have experienced SR max retransmission; determining whether the UE which currently received SR max retransmission triggered physical random access channel (PRACH) is a SR max retransmission triggered UE, wherein the SR max retransmission triggered UE is a UE present in the SR max retransmission pool; identifying one or more Resource Blocks (RBs) allocated for physical uplink control channel (PUCCH) to the UE having corresponding uplink control information (UCI) decoding success indicator greater than a threshold indicator, in response to determining that the UE is an SR max retransmission triggered UE; and allocating the identified one or more RBs to the UE for transmitting one or more subsequent SR.

In an example embodiment, a base station configured to implement the above two methods of reducing SR max retransmissions is disclosed.

Various example embodiments of the disclosure make it possible to reduce the SR Max Retransmission occurrence in the system as SR Max Retransmission has a detrimental impact on System KPIs. When SR Max Retransmissions occur, UE experiences data stall due to suspended DL/UL traffic. Various embodiments of the disclosure provide preemptive schemes which can be adopted to avoid this overhead.

To further clarify advantages and features of the disclosure, a more particular description of the disclosure will be rendered by reference to various example embodiments thereof, which is illustrated in the appended drawings. It is appreciated that these drawings depict example embodiments of the disclosure and are therefore not to be considered limiting of its scope. The disclosure will be described and explained with additional specificity and in greater detail with the accompanying drawings.

BRIEF DESCRIPTION OF THE DRAWINGS

These and other features, aspects, and advantages of certain embodiments of the present disclosure will be more apparent from the following detailed description, taken in conjunction with the accompanying drawings wherein like characters represent like parts throughout the drawings, and in which.

Figure 1:
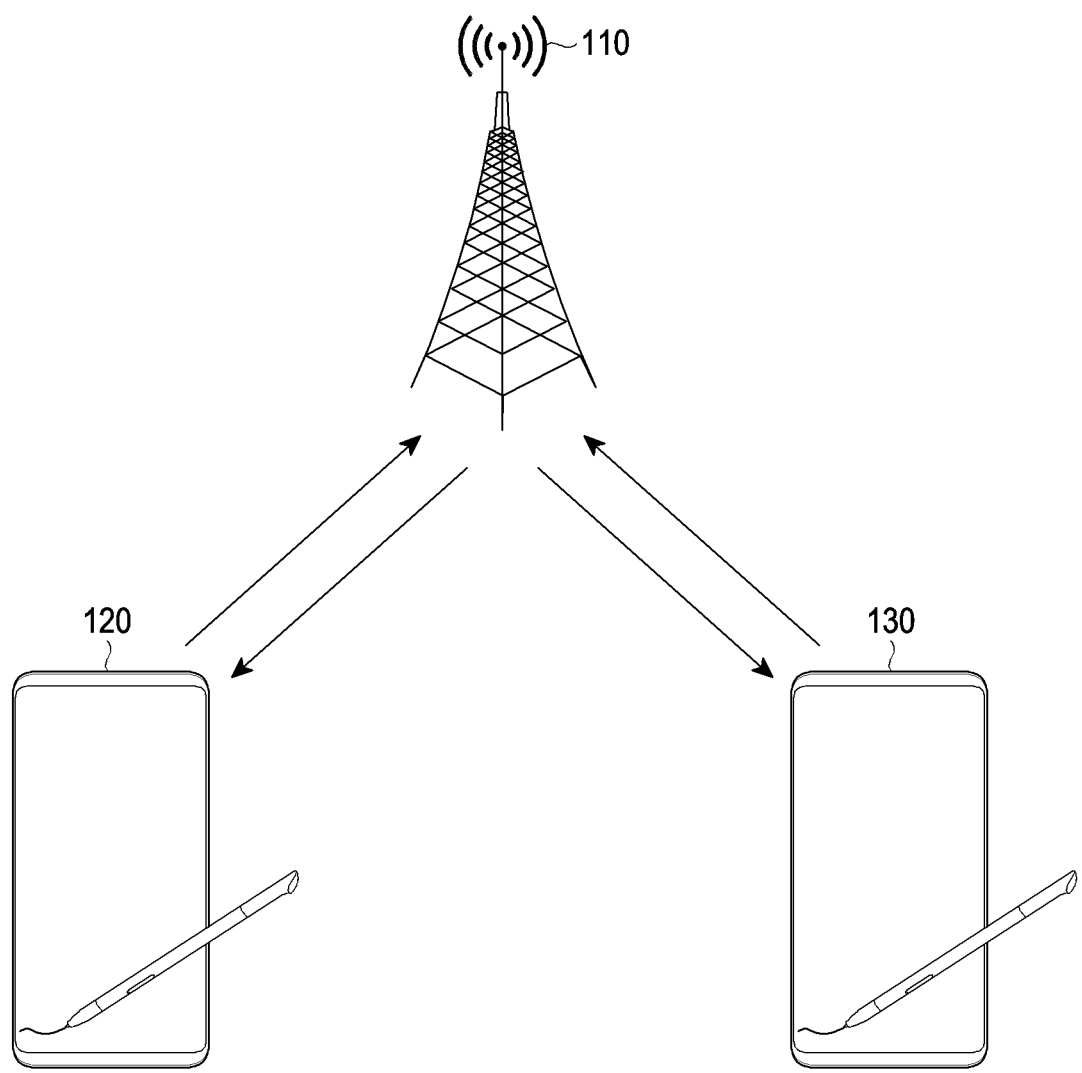
FIG. 1 is a diagram illustrating an example wireless communication system, according to various embodiments.

Further, skilled artisans will appreciate that elements in the drawings are illustrated for simplicity and may not have been necessarily been drawn to scale. For example, the flow charts illustrate the method in terms of prominent steps involved to help to aid in understanding of aspects of the present disclosure. Furthermore, in terms of the construction of the device, one or more components of the device may have been represented in the drawings by conventional symbols, and the drawings may show those details that are pertinent to understanding the various example embodiments of the present disclosure so as not to obscure the drawings with details that will be readily apparent to those of ordinary skill in the art.

DETAILED DESCRIPTION

For promoting an understanding of the principles of the disclosure, reference will now be made to various example embodiments illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art.

It will be understood by those skilled in the art that the foregoing general description and the following detailed description are explanatory examples of the disclosure and are not intended to be restrictive thereof.

Reference throughout this disclosure to "an aspect", "another aspect" or similar language may refer, for example, to a particular feature, structure, or characteristic described in connection with the embodiment being included in at least one embodiment of the present disclosure. Thus, appearances of the phrase "in an embodiment", "in another embodiment" and similar language throughout this disclosure may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

5G New Radio (NR) aims for high data rate transmission and ultra-reliable/available low-latency links. SR Max Retransmission may be a situation where there is significant impact to the overall system KPIs especially to latency and user experience. This procedure has an overhead in terms of time, resources, signaling and processing at UE and gNB. The various embodiments of the disclosure may reduce the occurrence of SR Max Retransmission in the system. This disclosure discloses a Prediction algorithm which predicts the SR Max Retransmission occurrence in advance. Additionally, new methods presented in this disclosure include UL Dummy Grant decision (utilizing AI Model) based on prediction algorithm and Prioritization of UCI allocation for SR based on SR decoding (utilizing Weighted moving average & K-Means Clustering), which minimize and/or reduce the occurrence of SR Max Retransmission to a large extent. The various embodiments of the disclosure improve the cell throughput, user experience in terms of reduced data stall and enhanced UCI (SR) decoding success rate.

FIG. 1 is a diagram illustrating an example wireless communication system according to various embodiments. For example, FIG. 1 illustrates a base station 110, a terminal 120, and a terminal 130 as some of nodes that use a wireless channel in a wireless communication system. Although a single base station is illustrated in FIG. 1, another base station that is the same as, similar to or different from, the base station 110 may be further included. Examples of the wireless communication system may include one or more terminals, such as the terminals 120 and 130, and one or more radio network nodes, such as the base station 110, capable of communicating with the terminals 120 and 130. The wireless communication system may also include any additional elements suitable to support communication between terminals 120 and 130 or between a terminal, such as the terminal 120, and another communication device (such as a landline telephone).

The base station 110 may be a network infrastructure that provides radio access to the terminals 120 and 130. The base station 110 may have coverage defined by a predetermined (e.g., specified) geographic area based on a distance to which the base station 110 is capable of transmitting a signal. The base station 110 may, for example, be referred to as "access point (AP)," "eNodeB (eNB)," "gNodeB (gNB)," "5th generation node (5G node)", "6$^{th}$ Generation Node (6G node)" "wireless point," "network node", "transmission/reception point (TRP)," or other terms having equivalent technical meaning, in addition to "base station." Furthermore, examples of the base station 110 may include but are not limited to gNb, VRAN, ORAN, C-RAN etc.

In an example, each of the terminal 120 and the terminal 130 may include a device used by a user, and may perform communication with the base station 110 via a wireless channel. Depending on the case, at least one of the terminals 120 and 130 may operate irrespective of handling by a user. For example, at least one of the terminals 120 and the terminal 130 may be a device that performs machine type communication (MTC), and may not be carried by a user. Each of the terminal 120 and the terminal 130 may be referred to as "user equipment (UE)," "mobile station," "subscriber station," "remote terminal," "wireless terminal," "user device," or other terms having the equivalent technical meaning, in addition to "terminal."

In an example, a base station may include any suitable combination of hardware and/or software. For example, in various embodiments, a base station, such as base station 110, may include the components described with respect to FIG. 4 below.

The base station 110, the terminal 120, and the terminal 130 may transmit and receive wireless signals in a millimeter wave (mmWave) band (e.g., 28 GHz, 30 GHz, 38 GHz, or 60 GHz). In this case, to improve a channel gain, the base station 110, the terminal 120, and the terminal 130 may perform beamforming. The beamforming may include transmission beamforming and reception beamforming. For example, the base station 110, the terminal 120, and the terminal 130 may assign directivity to a transmission signal or a reception signal. To this end, the base station 110 and the terminals 120 and 130 may select serving beams via a beam search or beam management procedure. After the serving beams are selected, communication may be performed via resources that are in the quasi co-located (QCL) relationship with resources used for transmitting the serving beams.

According to an embodiment, the base station 110, the terminal 120, and the terminal 130 may transmit and receive wireless signals in a band other than the millimeter wave band. In other words, the band at which the base station 110, the terminal 120, and the terminal 130 transmit and receive wireless signals is not limited to the millimeter wave band. In this case, the base station 110, the terminal 120, and the terminal 130 may perform mutual communication without performing beamforming.

In an example, in the wireless communication system, the base station 110, the terminal 120, and the terminal 130 may use any suitable radio access technology, such as, for example, and without limitation, long term evolution (LTE), LTE-Advanced, UMTS, HSPA, GSM, cdma2000, NR, WiMax, WiFi, and/or other suitable radio access technology. In an example, the wireless communication system may include any suitable combination of one or more radio access technologies. For purposes of example, various embodiments may be described within the context of certain radio access technologies. However, the scope of the disclosure is not limited to the examples and other embodiments could use different radio access technologies.

Figure 2:
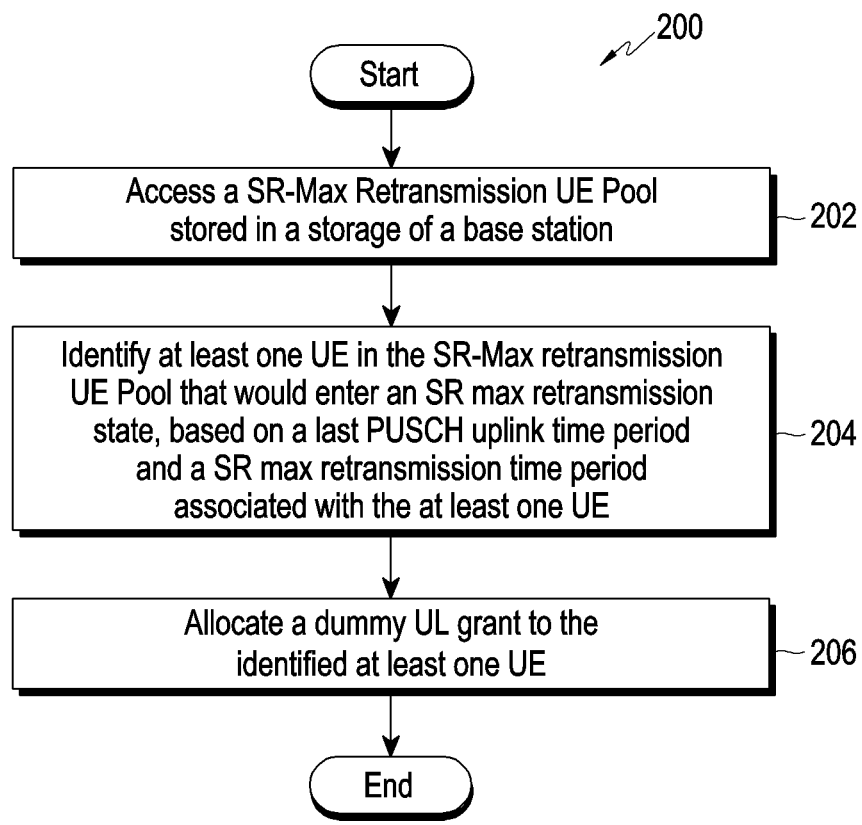
FIG. 2 is a flowchart illustrating an example method of handling SR failure in a communication network, according to various embodiments.

FIG. 2 is a flowchart illustrating an example method 200 of reducing SR max retransmissions in a communication network, according to various embodiments. In an example, aspects of the method 200, as described herein, may be implemented by one or more components of a base station as illustrated and described in FIG. 4.

At operation 202, the method 200 comprises accessing a SR max retransmission UE pool stored in a storage of the base station. The SR max retransmission UE pool may be understood as a list of plurality of UEs, maintained at the base station, which experienced SR max retransmission. In an example, the base station 110 may add the UEs that experienced SR max retransmission, to the SR max retransmission UE pool, such as the terminal 120.

At operation 204, the method 200 comprises identifying at least one UE in the SR max retransmission UE pool that would enter an SR max retransmission state, based on a last PUSCH uplink time period and a SR max retransmission time period associated with that UE. In an example, the method 200 may include periodically running a prediction algorithm for the plurality of UEs in the SR max retransmission pool to identify UEs that may enter the SR max retransmission state. Accordingly, in an example embodiment, at least one UE that would enter is identified.

Without limitation, the last PUSCH uplink time period may be understood as a time period elapsed since last PUSCH packet from UE was received. Furthermore, the SR max retransmission time period may be understood as a time period after which the UE would enter the SR max retransmission state. In an example, the SR max retransmission time period may be determined based on several factors, such as sr-TransMax, sr-ProhibitTimer, sr-Periodicity, and delta. Herein, the sr-TransMax may refer, for example, to a maximum number of SR transmissions, the sr-ProhibitTimer may refer, for example, to a timer for limiting successive SR transmission on PUCCH, and the sr-Periodicity may refer, for example, to a Periodicity of SR transmission as per Scheduling Request Configuration. Furthermore, the delta may refer, for example, to a configurable parameter to accommodate for the PUSCH scheduling margin. In an example, the values of the sr-TransMax, sr-ProhibitTimer, and sr-Periodicity may be learned from the RRC configuration for the UE and the value of the delta may be determined based on the receiver chain delay and the processing delay of the base station.

In an example embodiment, for identifying whether the UE would enter the SR max transmission state or not, the method 200 may include determining whether the time elapsed from last successfully decoded PUSCH uplink, referred to as last PUSCH time period, has crossed a threshold time period of the SR max retransmission time period or not. In an example, starting from zero counter, the threshold time period may be understood as a time period which is less than the SR max retransmission time period. For example, the threshold time period may be a time period immediately preceding the SR max retransmission time period. For example, if the SR max retransmission time period is 10 milliseconds, then the threshold time period may be 9 milliseconds.

Accordingly, in an example if the last PUSCH uplink time period is determined to have crossed the threshold time period of the SR max retransmission time period, it is identified that the UE would enter the SR max retransmission state. Continuing with the above example, if the last PUSCH uplink time period is determined to be 9 milliseconds, then it may be identified that the UE would enter the SR max retransmission state. In another example if the last PUSCH uplink time period is determined to be have not crossed the threshold time period of the SR max retransmission time period, it is identified that that the UE would not enter the SR max retransmission state. As an example, consider that the last PUSCH uplink time period is 4 milliseconds. Accordingly, it may be identified that the UE would not enter the SR max retransmission state.

At operation 206, the method 200 comprises allocating a dummy UL grant to the identified at least one UE. In an example, the allocation of the dummy UL grant may be done via Physical Downlink Control Channel (PDCCH). Furthermore, the Physical Random Access Channel (PRACH) may be triggered.

According to various example embodiments of the present disclosure, a probability of an SR-Max retransmission event occurring for a plurality of UEs handled by the base station may be determined. Accordingly, the UE(s) having a higher chance of avoiding SR-Max retransmission upon being provided with a dummy UL grant may be selected, based on the probabilities of the UEs. In an example, a technique modelled, for example, by Multi armed bandit model may be implemented. In an example, the different UEs may include the different arms in the model and a suitable technique, for example, Upper Confidence Bound technique, may be used to select the UE, which yields the best results, e.g., having the highest probability of avoiding getting into SR-Max retransmission.

Figure 3:
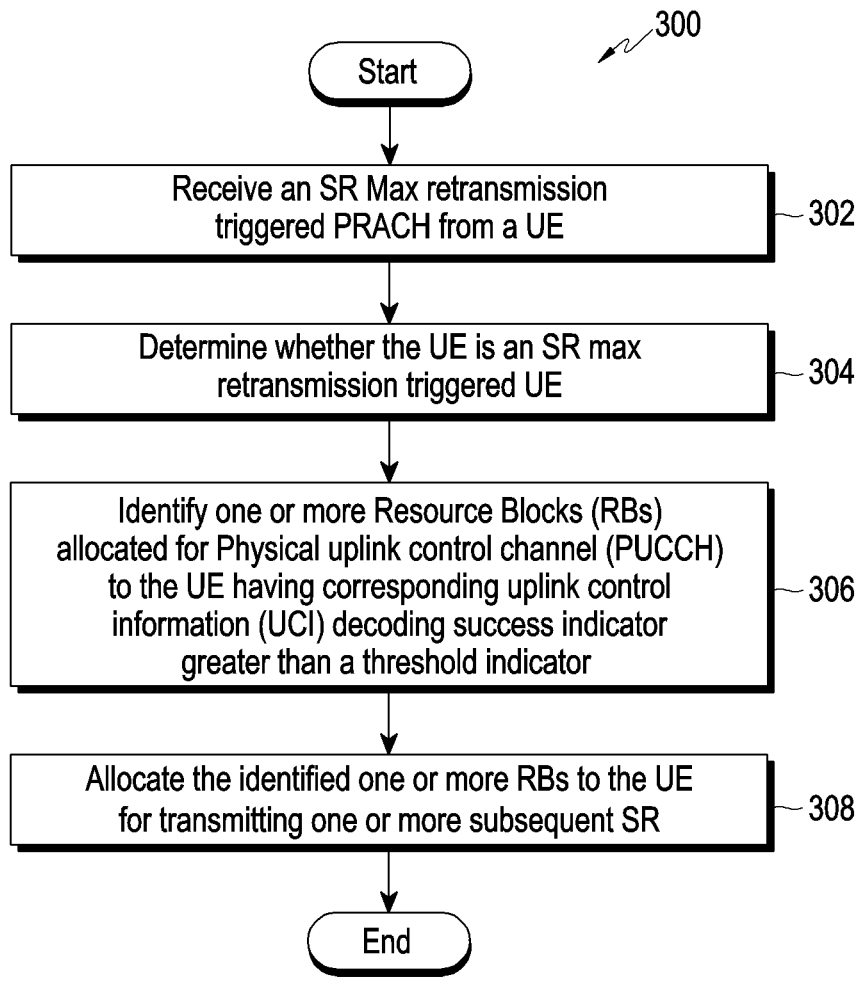
FIG. 3 is a flowchart illustrating an example method of handling SR failure in a communication network, according to various embodiments.
Figure 4:
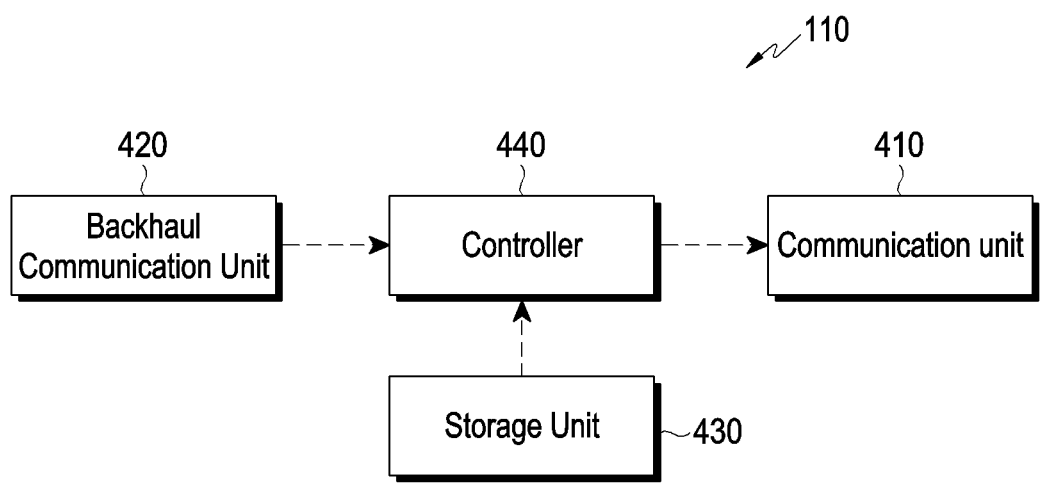
FIG. 4 is a block diagram illustrating an example configuration of a base station, according to various embodiments.

FIG. 3 is a flowchart illustrating an example method 300 of reducing SR max retransmissions in a communication network, according to various embodiments. In an example, aspects of the method 300, as described herein, may be implemented by one or more components of a base station as illustrated in FIG. 4 and described below.

At operation 302, the method 300 includes receiving a SR Max retransmission triggered PRACH from a UE. In an example, a base station, such as the base station 110, may receive the SR Max retransmission triggered PRACH from the UE, such as a terminal 120.

At operation 304, the method 300 includes determining whether the UE is an SR max retransmission triggered UE. In an example, the SR max retransmission triggered UE may be understood as a UE which has previously entered the SR max retransmission state. In an example, records related to previous SR transmissions of the UE may be maintained, for example, in a network node, such as the base station itself, of the communication system. Accordingly, the base station may access such records and may identify whether the UE is a SR max retransmission triggered UE or not. In an example, the records may include data for a limited time period. For instance, data for previous 1 hour or two hours of operations may be included.

At operation 306, the method 300 includes identifying one or more Resource Blocks (RBs) allocated for Physical uplink control channel (PUCCH) to the UE having corresponding uplink control information (UCI) decoding success indicator greater than a threshold indicator, in response to determining that the UE is an SR max retransmission triggered UE.

In an example, the UCI decoding success indicator associated with a given RB may be understood as a value that is indicative of how successfully a plurality of SRs that have been received over the given RB have been decoded. In a non-limiting example, the UCI decoding success indicator may be a percentage, a fraction, a decimal number, etc. In an example, the threshold indicator may be understood as a value having the same unit as that of the UCI decoding success indicator. In an example, the threshold indicator may be set by a network operator, for example, an administrator. In an example, a given RB whose corresponding UCI decoding success indicator is greater than the threshold indicator is considered as a good candidate for allocation to the UE which is experiencing repeated SR max retransmission state operations.

In an example, the method 300 includes maintaining the UCI decoding success indicator corresponding to each of a plurality of RBs associated with the UE. In an example, the UCI decoding success indicator may be maintained in a storage space coupled to the base station. This storage space may be an internal storage space, for example, a memory, of the base station or an external storage space to which the base station may have access to. This external storage space may be provided in any other network node in the communication network, in an example.

In an example, the UE may be communicating using frequency range 1 (FR1). Herein the maintaining of the UCI decoding success indicator for each of the plurality of RBs includes the following steps. In said example, a plurality of UCI decoding reports corresponding to the RB may be recorded. In an example, each of the plurality of UCI decoding reports comprises data related to decoding of a plurality of SRs received from one or more UEs over the RB. For example, the UCI decoding report may include a decoding status, e.g., successful or unsuccessful, for each of the plurality of SRs.

The method 300 may include selecting a set of UCI decoding reports from the plurality of UCI decoding reports corresponding to the RBs. In an example, the set of UCI decoding reports may include last N reports from recorded plurality of UCI decoding reports. The method 300 may include determining the UCI decoding success indicator for the RB based on the selected set of UCI decoding reports. In an example, a ratio of the successful to unsuccessful decoded SRs may be calculated. Accordingly, the UCI decoding success indicator may be determined based on the calculated ratio. For instance, a percentage may be determined based on the ratio.

In the example where the UE is communicating using the FR1, the identification of the one or more RBs that have UCI decoding success indicator greater than the threshold indicator may be done by implementing the weighted moving average technique. The RB ranges with higher decoding failures can be identified and discarded.

In another example, the UE may be communicating using frequency range 2 (1-R2). The maintaining of the UCI decoding success indicator for each of the plurality of RBs includes the following operations. In this example, a plurality of UCI decoding reports corresponding to the RB may be recorded. In an example, each of the plurality of UCI decoding reports comprises data related to decoding of a plurality of SRs received from one or more UEs over the RB. For example, the UCI decoding report may include a decoding status, e.g., successful or unsuccessful, for each of the plurality of SRs. Furthermore, the UCI decoding report may include data related to corresponding beams and distances associated with each of the plurality of SRs. For example, for each SR, the UCI decoding report may also include information about a distance between the base station and the UE and information associated with a beam over which this SR request was received.

The method 300 may include selecting a set of UCI decoding reports from the plurality of UCI decoding reports corresponding to the RBs. In an example, the set of UCI decoding reports may include last N reports from recorded plurality of UCI decoding reports. The method 300 may include determining the UCI decoding success indicator for the RB based on the selected set of UCI decoding reports. In an example, a ratio of the successful to unsuccessful decoded SRs may be calculated. Accordingly, the UCI decoding success indicator may be determined based on the calculated ratio. For instance, a percentage may be determined based on the ratio.

In an example where the UE is communicating using the FR2, the identification of the one or more RBs that have UCI decoding success indicator greater than the threshold indicator may be done by implementing, for example, the K-means clustering technique. Interference hotspots may be identified based on cluster variance threshold. These interference hotspots may include RBs with high decoding failure rates. Such RBs may be deprioritized RBs for UCI allocation for an SR MAX Retransmission triggered UE which has a similar beam and distance.

In yet another example, wherein the UE may be operating in either of the FR1 and FR2 with time division duplex, the maintaining of the decoding success indicator comprises the following operations. In an example, the method may include configuring the UE to perform sub-band reporting for the plurality of RBs. By configuring the UE to perform the sub-band reporting, the UE is required to transmit a Channel Quality Indicator (CQI) report corresponding to each of the plurality of RBs. The CQI report, in an example, is indicative of a quality of the RB.

The method 300 may include receiving the CQI report corresponding to each of the plurality of RBs from the UE and determining the UCI decoding success indicator for each of the plurality of RBs based on the corresponding CQI. In an example, the base station may be configured to identify relative reliability of the RBs in downlink based on the CQI reports. Accordingly, based on channel reciprocity in the time division duplex, the base station may infer the reliability in the uplink. Accordingly, in an example, the base station may deprioritize one or more RBs with lower CQI levels for UCI allocation for the UE.

At operation 308, the method 300 includes allocating the identified one or more RBs to the UE for transmitting one or more subsequent SR. By doing so, it is ensured that an RB of good quality is allocated to the UE. Accordingly, probability of subsequent SR requests being successfully processed increases.

FIG. 4 is a diagram illustrating an example configuration of a base station 110 in a wireless communication system according to various embodiments. The configuration of FIG. 5 may be understood as a part of the configuration of the base station 110. Hereinafter, it is understood that terms including "unit" or "er" at the end may refer to the unit for processing at least one function or operation and may be implemented in hardware, software, or a combination of hardware and software.

Referring to FIG. 4, the base station 110 may include a wireless communication unit (e.g., including wireless communication circuitry) 410 (e.g., wireless communicator or wireless communication interface), a backhaul communication unit (e.g., including communication circuitry) 420 (e.g., backhaul communicator or backhaul communication interface), a storage unit (e.g., a memory) 430 (e.g., storage), and a controller (e.g., including control or processing circuitry) 440 (e.g., at least one processing device).

The wireless communication unit 410 may include various communication circuitry and executes functions for transmitting and receiving signals via a wireless channel. For example, the wireless communication unit 410 performs a function of conversion between a baseband signal and a bit stream according to the physical layer standard of a system. By way of further example, when data is transmitted, the wireless communication unit 410 generates complex symbols by encoding and modulating a transmission bit stream. Similarly, when data is received, the wireless communication unit 410 restores a reception bit stream by demodulating and decoding a baseband signal. Furthermore, the wireless communication unit 410 up-converts a baseband signal into a radio-frequency (RF) band signal and transmits the same via an antenna, and down-converts an RF band signal received via an antenna into a baseband signal.

For example, the wireless communication unit 410 may include, for example, and without limitation, a transmission filter, a reception filter, an amplifier, a mixer, an oscillator, a digital-to-analog convertor (DAC), an analog-to-digital convertor (ADC), and the like. The wireless communication unit 410 may include or utilize a plurality of transmission and reception paths. Furthermore, the wireless communication unit 410 may include at least one antenna array including a plurality of antenna elements. From the perspective of hardware, the wireless communication unit 410 may include a digital unit (e.g., including digital circuitry) and/or an analog unit (e.g., including analog circuitry), and the analog unit may include a plurality of sub-units based on an operating power, an operating frequency, or the like.

The wireless communication unit 410 may transmit and receive a signal as described above. Accordingly, the entirety or a part of the wireless communication unit 410 may be referred to as "transmitting unit," "receiving unit," "transceiving unit," "transmitter," "receiver," or "transceiver." The transmission and reception performed via the wireless channel, which is described herein below, may include the above-described processing performed by the wireless communication unit 410.

The backhaul communication unit 420 may include various communication circuitry and provides an interface for performing communication with other nodes within the network. For example, the backhaul communication unit 420 converts a bit stream that is transmitted from the base station 110 to another node, for example, another access node, another base station, an upper node, a core network or the like, into a physical signal, and converts a physical signal received from another node into a bit stream.

The storage unit 430 may include a memory or storage and store data, such as a basic program, an application program, configuration information, and the like for operating the base station 110. The storage unit 430 may be configured as a volatile memory, a non-volatile memory, or a combination of a volatile memory and a non-volatile memory. In addition, the storage unit 430 may provide data stored therein in response to a request from the controller 440.

The controller 440 may include various control or processing circuitry and control overall operations of the base station 110. For example, the controller 440 may control various components of the base station to transmit and receive signals via the wireless communication unit 410 or the backhaul communication unit 420. Further, the controller 440 records data in the storage unit 430 and reads the recorded data. The controller 440 may perform the functions of a protocol stack required by a particular communication standard. To this end, the controller 440 may include at least one processor.

According to an embodiment, the controller 440 may perform control such that a base station, such as the base station 110, either alone or in conjunction with other network nodes, or any other network node, performs operations according to various embodiments described above. For the sake of brevity, details of the embodiments that have been already described above may not described in detail herein.

In an example embodiment, the communication unit 410 may be configured to receive a scheduling request (SR) from a UE seeking an uplink (UL) grant, such as the terminal 120. In said example embodiment, the controller 440 may be configured to maintain a SR max retransmission UE pool at the base station, wherein the SR max retransmission UE pool comprises a list of plurality of UEs, which experienced SR max retransmission. The controller 440 may be further configured to periodically run a prediction algorithm for the plurality of UEs in the SR max retransmission pool and predict whether each UE would enter an SR max retransmission state based on a last PUSCH uplink time period and a SR max retransmission time period. Herein the last PUSCH uplink time period is the time elapsed since last PUSCH packet from UE was received. Furthermore, the SR max retransmission time period is a time period after which the UE would enter the SR max retransmission state.

In an example embodiment, for predicting whether the UE would enter an SR max retransmission state, the controller 440 may be further configured to determine whether the last PUSCH uplink time period has crossed a threshold time period of the SR max retransmission time period or not. Furthermore, the controller 440 may be configured to predict that the UE would enter the SR max retransmission state, if the last PUSCH uplink time period is determined to have crossed the threshold time period of the SR max retransmission time period. Furthermore, the controller 440 may be configured to predict that the UE would not enter the SR max retransmission state, if the last PUSCH uplink time period is determined to have not crossed the threshold time period of the SR max retransmission time period.

Accordingly, the controller 440 may be configured to allocate a dummy UL grant to the UE, in response to predicting that the UE would enter the SR max retransmission state.

In an embodiment, the communication unit 410 may be configured to receive a scheduling request (SR) from a UE seeking an uplink (UL) grant, such as the terminal 120. In said example embodiment, the controller 440 may be configured to determine whether the UE is a SR max retransmission triggered UE. Herein, the SR max retransmission triggered UE is a UE which has previously entered the SR max retransmission state. Furthermore, in response to determining that the UE is an SR max retransmission triggered UE, the controller 440 may be configured to identify one or more Resource Blocks (RBs) allocated for Physical uplink control channel (PUCCH) to the UE having corresponding uplink control information (UCI) decoding success indicator greater than a threshold indicator.

In an example embodiment, the controller 440 may be configured to maintain the UCI decoding success indicator corresponding to each of a plurality of RBs associated with the UE in a storage space coupled to the base station.

In an example embodiment, in which the UE is communicating using frequency range 1 (FR1), for maintaining the UCI decoding success indicator for each of the plurality of RBs, the controller 440 may be further configured to record a plurality of UCI decoding reports corresponding to the RB, wherein each of the plurality of UCI decoding reports comprises data related to decoding of a plurality of SRs received from one or more UEs over the RB. Furthermore, the controller 440 may be configured to select a set of UCI decoding reports from the plurality of UCI decoding reports corresponding to the RB. Furthermore, the controller 440 may be configured to determine the UCI decoding success indicator for the RB based on the selected set of UCI decoding reports.

In an example embodiment, in which the UE is communicating using frequency range 2 (FR2), for maintaining the UCI decoding success indicator for each of the plurality of RBs, the controller 440 may be configured to record a plurality of UCI decoding reports corresponding to the RB, wherein each of the plurality of UCI decoding reports comprises data related to decoding of a plurality of SRs received from one or more UEs over the RB and corresponding beams and distances associated with each of the plurality of SRs. Furthermore, the controller 440 may be configured to select a set of UCI decoding reports from the plurality of UCI decoding reports corresponding to the RB. Furthermore, the controller 440 may be configured to determine the UCI decoding success indicator for the RB based on the selected set of UCI decoding reports.

In an example embodiment, in which the UE is communicating using one of a frequency range 1 (FR1) and a frequency range 2 (FR2), for maintaining the UCI decoding success indicator, the controller 440 may be configured to configure the UE to perform sub-band reporting for the plurality of RBs, the sub-band reporting comprising transmission of a Channel Quality Indicator (CQI) report corresponding to each of the plurality of RBs. Furthermore, the controller 440 may be configured to receive, using the communication unit 410, the CQI report corresponding to each of the plurality of RBs from the UE. Furthermore, the controller 440 may be configured to determine the UCI decoding success indicator for each of the plurality of RBs based on the corresponding CQI.

In an example embodiment, once the one or more RBs are identified, the controller 440 may be configured to allocate the identified one or more RBs to the UE for transmitting one or more subsequent SR.

Figure 5:
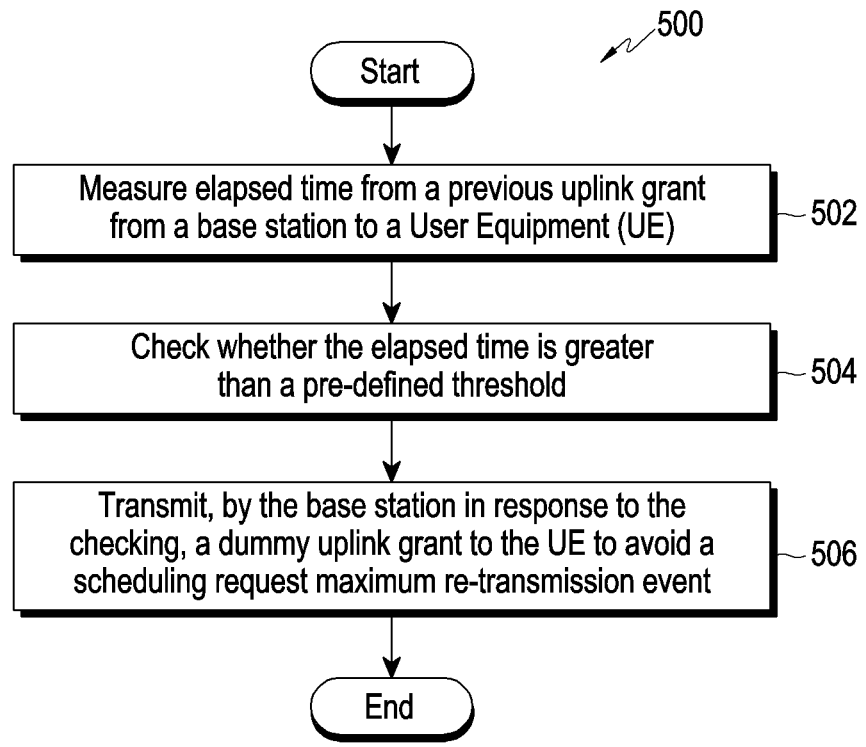
FIG. 5 is a flowchart illustrating an example method of handling SR failure in a network, according to various embodiments.

FIG. 5 is a flowchart illustrating an example method 500 of handling SR failure in a network, according to various embodiments. In an example, aspects of the method 500, as described herein, may be implemented by one or more components of a base station as illustrated and described in FIG. 4.

At operation 502, the method 500 includes measuring elapsed time from a previous uplink grant from a base station to a User Equipment (UE). In an example, the elapsed time may be measured by the base station using an internal clock or any other time-keeping mechanism.

At operation 504, the method 500 includes, checking whether the elapsed time is greater than a pre-defined (e.g., specified) threshold. This specified threshold may be implementation specific and may be set by an administrator. As would be appreciated, the threshold may be set after evaluating network parameters for a specific geographic location, and accordingly, the threshold may be different for different geographic locations. In an example, this pre-defined threshold is less than the SR max retransmission time period.

At operation 506, the method 500 includes transmitting, by the base station in response to the checking, a dummy uplink grant to the UE to avoid a scheduling request maximum re-transmission event. In an example, the dummy uplink grant may be transmitted when the elapsed time period is determined to be more than the pre-defined threshold. This averts in SR max retransmission event In various example embodiments, the method 500 may further include evaluating a plurality of parameters related to the UE, for example, using a neural network. Accordingly, the time of occurrence of SR maximum re-transmission event at the UE, may be predicted by the neural network, based on the plurality of parameters related to the UE. Without limitation, the plurality of parameters related to the UE comprises: at least one of Elapsed time from last uplink grant airtime for UE, Elapsed time from last successfully decoded PUSCH reception, Number of SRs received in a time duration, Elapsed time from last SR reception for the UE.

The aspects of the present disclosure may provide at least the following advantages. Owing to the dummy Uplink grant, the SR max retransmission is avoided. As a result, reduced number of data stalls and faster uplink data request servicing is observed. This improves the user experience of availing network services. Furthermore, several KPI improvements are observed at the network level. For instance, SR decoding success rate is improved, and uplink throughput is also improved. Furthermore, downlink throughput and retainability is also improved. Furthermore, RRC signalling overhead and random access overhead is also reduced, thereby resulting in gNB and UE processing improvement.

While specific language has been used to describe the present disclosure, any limitations arising on account thereto, are not intended. As would be apparent to a person in the art, various working modifications may be made to the method to implement the disclosure as taught herein. The drawings and the foregoing description give examples of embodiments. Those skilled in the art will appreciate that one or more of the described elements may well be combined into a single functional element. Certain elements may be split into multiple functional elements. Elements from one embodiment may be added to and/or used in conjunction with another embodiment.

What is claimed is:

1. A method of a base station, for handling Scheduling Request (SR) failure in a network, the method comprising:
   accessing a SR max retransmission user equipment (UE) pool maintained in a storage of the base station, wherein the SR max retransmission UE pool includes a list of plurality of UEs, which experienced SR max retransmission;
   identifying at least one UE in the SR max retransmission UE pool which would enter an SR max retransmission state based on a last Physical Uplink Shared Channel (PUSCH) uplink time period and a SR max retransmission time period associated with the at least one UE, wherein the last PUSCH uplink time period is a time period elapsed since last PUSCH packet from UE was received, and wherein the SR max retransmission time period is a time period after which the UE would enter the SR max retransmission state; and
   allocating a dummy uplink (UL) grant to the identified at least one UE.

2. The method of claim 1, wherein the identifying further comprises:
   determining whether the last PUSCH uplink time period has crossed a threshold time period, wherein the threshold time period is less than the SR max retransmission time period;
   identifying that the UE would enter the SR max retransmission state, based on the last PUSCH uplink time period being determined to have crossed the threshold time period; and
   identifying that the UE would not enter the SR max retransmission state, based on the last PUSCH uplink time period being determined to not have crossed the threshold time period.

3. A base station, comprising:
   a communication unit comprising communication circuitry configured to receive a scheduling request (SR) from a user equipment (UE) seeking an uplink (UL) grant;
   a storage unit comprising a memory storing a Scheduling Request (SR) max retransmission UE pool, wherein the SR max retransmission UE pool comprises a list of plurality of UEs, which experienced SR max retransmission; and
   a controller coupled to the communication unit and the storage unit, wherein the controller is configured to:
   access the SR max retransmission UE pool;
   identify at least one UE in the SR max retransmission UE pool which would enter an SR max retransmission state, based on a last PUSCH uplink time period and a SR max retransmission time period associated with the at least one UE, wherein the last PUSCH uplink time period is a time period elapsed since last PUSCH packet from UE was received, and wherein the SR max retransmission time period is a time period after which the UE would enter the SR max retransmission state; and
   allocate a dummy UL grant to the identified at least one UE.

4. The base station of claim 3, wherein, to predict whether the UE would enter an SR max retransmission state, the controller is further configured to:
   determine whether the last PUSCH uplink time period has crossed a threshold time period of the SR max retransmission time period;
   identify that the UE would enter the SR max retransmission state, based on the last PUSCH uplink time period being determined to have crossed the threshold time period of the SR max retransmission time period; and
   identify that the UE would not enter the SR max retransmission state, based on the last PUSCH uplink time period being determined to not have crossed the threshold time period of the SR max retransmission time period.

5. A method, of operating a base station, for handling Scheduling Request (SR) failure in a network, the method comprising:
   receiving, at the base station, a SR Max retransmission triggered Physical Random Access Channel (PRACH) from a user equipment (UE);
   determining whether the UE is an SR max retransmission triggered UE, wherein the SR max retransmission triggered UE is a UE which has previously entered the SR max retransmission state; and
   identifying one or more Resource Blocks (RBs) allocated for Physical uplink control channel (PUCCH) to the UE having corresponding uplink control information (UCI) decoding success indicator greater than a threshold indicator, in response to determining that the UE is an SR max retransmission triggered UE; and
   allocating the identified one or more RBs to the UE for transmitting one or more subsequent SR.

6. The method of claim 5, further comprises:
   maintaining the UCI decoding success indicator corresponding to each of a plurality of RBs associated with the UE in a storage space coupled to the base station.

7. The method of claim 6, wherein the UE is configured to communicate using frequency range 1 (FR1), wherein maintaining the UCI decoding success indicator for each of the plurality of RBs, comprises:
   recording a plurality of UCI decoding reports corresponding to the RB, wherein each of the plurality of UCI decoding reports comprises data related to decoding of a plurality of SRs received from one or more UEs over the RB;
   selecting a set of UCI decoding reports from the plurality of UCI decoding reports corresponding to the RB; and determining the UCI decoding success indicator for the RB based on the selected set of UCI decoding reports.

8. The method of claim 6, wherein the UE is configured to communicate using frequency range 2 (FR2), wherein maintaining the UCI decoding success indicator for each of the plurality of RBs, comprises:
recording a plurality of UCI decoding reports corresponding to the RB, wherein each of the plurality of UCI decoding reports comprises data related to decoding of a plurality of SRs received from one or more UEs over the RB and corresponding beams and distances associated with each of the plurality of SRs;
selecting a set of UCI decoding reports from the plurality of UCI decoding reports corresponding to the RB; and
determining the UCI decoding success indicator for the RB based on the selected predefined number of UCI decoding reports.

9. The method of claim 6, wherein the UE is configured to communicate using one of a frequency range 1 (FR1) and a frequency range 2 (FR2), wherein maintaining the UCI decoding success indicator comprises:
configuring the UE to perform sub-band reporting for the plurality of RBs, the sub-band reporting comprising transmission of a Channel Quality Indicator (CQI) report corresponding to each of the plurality of RBs; and
receiving the CQI report corresponding to each of the plurality of RBs from the UE; and
determining the UCI decoding success indicator for each of the plurality of RBs based on the corresponding CQI.

10. A base station (110), comprising:
a communication unit comprising communication circuitry configured to receive a scheduling request (SR) for uplink (UL) grant from a UE;
a storage unit comprising a memory; and
a controller coupled to the communication unit and the storage unit, wherein the controller is configured to:
determine whether the UE is a SR max retransmission triggered UE, wherein the SR max retransmission triggered UE is a UE which has previously entered the SR max retransmission state; and
identify one or more Resource Blocks (RBs) allocated for Physical uplink control channel (PUCCH) to the UE having corresponding uplink control information (UCI) decoding success indicator greater than a threshold indicator, in response to determining that the UE is an SR max retransmission triggered UE; and
allocate the identified one or more RBs to the UE for transmitting one or more subsequent SR.

11. The base station of claim 10, wherein the controller is further configured to:
maintain the UCI decoding success indicator corresponding to each of a plurality of RBs associated with the UE in a storage space coupled to the base station.

12. The base station of claim 11, wherein the UE is configured to communicate using frequency range 1 (FR1), and wherein, for maintaining the UCI decoding success indicator for each of the plurality of RBs, the controller is further configured to:
record a plurality of UCI decoding reports corresponding to the RB, wherein each of the plurality of UCI decoding reports comprises data related to decoding of a plurality of SRs received from one or more UEs over the RB;
select a set of UCI decoding reports from the plurality of UCI decoding reports corresponding to the RB; and
determine the UCI decoding success indicator for the RB based on the selected set of UCI decoding reports.

13. The base station of claim 11, wherein the UE is configured to communicate using frequency range 2 (FR2), and wherein, for maintaining the UCI decoding success indicator for each of the plurality of RBs, the controller (440) is further configured to:
record a plurality of UCI decoding reports corresponding to the RB, wherein each of the plurality of UCI decoding reports comprises data related to decoding of a plurality of SRs received from one or more UEs over the RB and corresponding beams and distances associated with each of the plurality of SRs;
select a set of UCI decoding reports from the plurality of UCI decoding reports corresponding to the RB; and
determine the UCI decoding success indicator for the RB based on the selected predefined number of UCI decoding reports.

14. The base station of claim 11, wherein the UE is configured to communicate using one of a frequency range 1 (FR1) and a frequency range 2 (FR2), and wherein, for maintaining the UCI decoding success indicator, the controller (440) is further configured to:
configure the UE to perform sub-band reporting for the plurality of RBs, the sub-band reporting comprising transmission of a Channel Quality Indicator (CQI) report corresponding to each of the plurality of RBs; and
receive, using the communication unit, the CQI report corresponding to each of the plurality of RBs from the UE; and
determine the UCI decoding success indicator for each of the plurality of RBs based on the corresponding CQI.

15. A method for handling scheduling request (SR) failure, the method comprising:
measuring elapsed time from a previous uplink grant from a base station to a User Equipment (UE);
checking whether the elapsed time is more than a predefined threshold; and
transmitting, by the base station in response to the checking, a dummy uplink grant to the UE to avoid a scheduling request maximum re-transmission event.

16. The method of claim 14, wherein the method further comprises:
evaluating by a neural network, a plurality of parameters related to the UE; and
predicting a time of occurrence of SR maximum re-transmission event at the UE, based on the plurality of parameters related to the UE.

17. The method of claim 15, wherein the plurality of parameters related to the UE comprises: at least one of elapsed time from last uplink grant airtime for UE, elapsed time from last successfully decoded PUSCH reception, number of SRs received in a time duration, elapsed time from last SR reception for the UE.

* * * * *